US008451897B2

(12) United States Patent
Robers et al.

(10) Patent No.: US 8,451,897 B2
(45) Date of Patent: May 28, 2013

(54) HIGHLY PARALLEL PIPELINED HARDWARE ARCHITECTURE FOR INTEGER AND SUB-PIXEL MOTION ESTIMATION

(75) Inventors: Marshall A. Robers, Durham, NC (US); Michael G. McNamer, Apex, NC (US); Joseph D. Wagovich, Raleigh, NC (US)

(73) Assignee: Atmel Corporation, San Jose, CA (US)

( * ) Notice: Subject to any disclaimer, the term of this patent is extended or adjusted under 35 U.S.C. 154(b) by 1383 days.

(21) Appl. No.: 11/566,540

(22) Filed: Dec. 4, 2006

(65) Prior Publication Data
US 2008/0130748 A1 Jun. 5, 2008

(51) Int. Cl.
*H04N 7/32* (2006.01)

(52) U.S. Cl.
USPC .................................................. 375/240.16

(58) Field of Classification Search
USPC .................................................. 375/240.16
See application file for complete search history.

(56) References Cited

U.S. PATENT DOCUMENTS

| 5,367,629 | A |  | 11/1994 | Chu et al. |
| 5,398,079 | A | * | 3/1995 | Liu et al. ........................ 348/699 |
| 6,037,918 | A | * | 3/2000 | Hansen et al. ................. 345/74.1 |
| 6,072,830 | A | * | 6/2000 | Proctor et al. ........... 375/240.22 |
| 6,157,677 | A | * | 12/2000 | Martens et al. .......... 375/240.16 |
| 6,587,590 | B1 | * | 7/2003 | Pan ................................ 382/250 |
| 6,970,938 | B2 | * | 11/2005 | Sugiyama et al. ............ 709/231 |
| 7,782,957 | B2 | * | 8/2010 | Yang ........................ 375/240.24 |
| 2004/0017852 | A1 |  | 1/2004 | Garrido et al. |
| 2004/0022318 | A1 |  | 2/2004 | Garrido et al. |
| 2005/0232360 | A1 | * | 10/2005 | Byun ........................ 375/240.17 |
| 2006/0002473 | A1 |  | 1/2006 | Mohan et al. |
| 2006/0002474 | A1 |  | 1/2006 | Au et al. |
| 2006/0008004 | A1 |  | 1/2006 | Karube et al. |
| 2006/0018381 | A1 |  | 1/2006 | Luo et al. |
| 2006/0018552 | A1 |  | 1/2006 | Malayath et al. |

OTHER PUBLICATIONS

A, Kaup et al., "Performance and Complexity Analysis of Rate Constrained Motion Estimation in MPEG-4", Proc. Multimedia Systems and Applications II, Boston, Mass., 20-22, SPIE, vol. 3842, Sep. 1999, pp. 202-211.
K. Yu et al., "Half-Pixel Motion Estimation Bypass Based on a Linear Model", Microsoft Research Asia, www .research.microsoft. com, 4 pages.

* cited by examiner

*Primary Examiner* — Sath V Perungavoor
*Assistant Examiner* — Jeffery Williams
(74) *Attorney, Agent, or Firm* — Fish & Richardson P.C.

(57) ABSTRACT

Disclosed is a pipelined motion estimation system and method. The pipelined motion estimation system includes a current frame input storage means for storing contents of a current frame and a previous frame input storage means for storing contents of one or more previous frames. A sum-of-absolute differences calculation module concurrently determines a best fit motion vector from a plurality of potential motion vectors where each of the plurality of potential motion vectors is based upon a pixel-based search pattern. A sum-of-absolute differences (SAD) logic block concurrently determines a minimum residual value from the plurality of motion vectors. The motion vector having the minimum residual value is used as a component in encoding video data.

23 Claims, 5 Drawing Sheets

HIGHLY PARALLEL PIPELINED HARDWARE ARCHITECTURE FOR INTEGER AND SUB-PIXEL MOTION ESTIMATION

TECHNICAL FIELD

The present disclosure related generally to video encoding, and more particularly to techniques for estimating motion in video compression systems.

BACKGROUND ART

Video images have become an increasingly important part of communications in general. The ability to nearly instantaneously transmit still images, and particularly, live moving images, have greatly enhanced global communications.

In particular, videoconferencing systems have become an increasingly important business communication tool. These systems facilitate meetings between persons or groups of persons situated remotely from each other, thus eliminating or substantially reducing the need for expensive and time-consuming business travel. Since videoconference participants are able to see facial expressions and gestures of remote participants, richer and more natural communication is engendered. In addition, videoconferencing allows sharing of visual information, such as photographs, chars, and figures, and may be integrated with personal computer applications to produce sophisticated multimedia presentations.

To provide cost-effective video communication, the bandwidth required to convey video must be limited. The typical bandwidth used for videoconferencing lies in the range of 128 to 1920 kilobits per second (Kbps). Problems associated with available videoconferencing systems as these systems attempt to cope with bandwidth limitations include slow frame rates, which results in a non-lifelike picture having an erratic, jerky motion; use of small video frames or limited spatial resolution of a transmitted video frame; and a reduction in the signal-to-noise ratio of individual video frames. Conventionally, if solutions such as reduced video frame size or limited spatial resolutions are not employed, higher bandwidths are required.

At 768 Kbps, digital videoconferencing, using state-of-the-art video encoding methods, produces a picture that may be likened to a scene from analog television. Typically, for most viewers, 24 frames per second (fps) are required to make video frames look fluid and give the impression that motion is continuous. As the frame rate is reduced below 24 fps, an erratic motion results. In addition, there is always a tradeoff between a video frame size required and available network capacity. Therefore, lower bandwidth requires a lower frame rate and/or reduced video frame size.

A standard video format used in videoconferencing, defined by resolution, is Common Intermediate Format (CIF). The primary CIF format is also known as Full CIF or FCIP. The International Telecommunications Union (ITU), based in Geneva, Switzerland (www.itu.ch), has established this communications standard. Additional standards with resolutions higher and lower than CIF have also been established. Resolution and bit rate requirements for various formats are shown in Table I below. The bit rates (in megabits per second, Mbps) shown are for uncompressed color frames where 12 bits per pixel is assumed.

TABLE I

Resolution and bit-rates for various CIF formats
Bit Rate at 30 fps

| CIF Format | Resolution (in pixels) | Mbps |
| --- | --- | --- |
| SQCIF (Sub Quarter CIF) | 128 × 96 | 4.424 |
| QCIF (Quarter CIF) | 176 × 144 | 9.124 |
| CIF (Full CIF, FCIF) | 352 × 288 | 36.50 |
| 4CIF (4 × CIF) | 704 × 576 | 146.0 |
| 16CIF (16 × CIF) | 1408 × 1152 | 583.9 |

Video compression is a means of encoding digital video to take up less storage space and reduce required transmission bandwidth. Compression/decompression (CODEC) schemes are frequently used to compress video frames to reduce required transmission bit rates. Overall, CODEC hardware or software compresses digital video into a smaller binary format than required by the original (i.e., uncompressed) digital video format.

H.263 is a document which described a common contemporary CODEC scheme, requiring a bandwidth from 64 to 1920 Kbps. H.263 is an ITU standard for compressing video and is generically known as a lossy compression method. Lossy coding assumes that some information can be discarded, which results in a controlled degradation of the decoded signal. The lossy coding method is designed to gradually degrade as a progressively lower bit rate is available for transmission. Thus, the use of lossy compression methods results in a loss of some of the original image information during the compression stage and, hence, the lost original image information becomes unrecoverable. For example, a solid blue background in a video scene can be compressed significantly with little degradation in apparent quality. However, other frames containing sparse amount of continuous or repeating image portions often cannot be compressed significantly without a noticeable loss in image quality.

Many video compression standards, including MPEG, MPEG-2, MPEG-4, H.261, and H.263 utilize a block-based Discrete Cosine Transform (DCT) operation on data blocks, 8×8 samples in size. A set of coefficients for each block is generated through the use of a two-dimensional DCT operation. Such coefficients relate to a spatial frequency content of the data block. Subsequently, the 64 DCT coefficients (one for each sample) in a block are quantized. For H.263, one quantizer step size is applied to every DCT coefficient in a data block and is part of the information that must be transmitted to a H.263 decoder. The quantization process is defined as a division of each DCT coefficient by the quantization step size followed by rounding to the nearest integer. An encoder applies variable uniform quantization to DCT coefficients to reduce the number of bits required to represent them. Compression may be performed on each of the pixels represented by a two-by-two array of blocks containing luminance samples and two blocks of chrominance samples. This array of six blocks is commonly referred to as a macroblock. The four luminance and two chrominance data blocks in a macroblock combine to represent a 16×16 pixel array.

In an H.263 encoder, variable uniform quantization is applied by means of the quantization parameter that provides quantization step sizes that may the values of DCT coefficients to a smaller set of values called quantization indices. In the H.263 decoder, DCT coefficient recovery is performed, roughly speaking, by multiplying the recovered quantization indices by the inverse quantization step size. The decoder then calculates an inverse DCT using the recovered coefficients.

Although the DCT and other methods have proven somewhat effective in utilizing spatial redundancy to limit the bit rate required to represent an image, there remains a need to improve video quality in a computationally-effective way. Video sequences tend to contain a large amount of temporal redundancy; in other words, areas of the current image are very likely to be similar to areas of a subsequent image. In any video compression method, motion estimation takes advantages of the temporal redundancy to reduce the required bit rate. Motion estimation is commonly performed between a current image frame and a previous image—the reference image frame. The motion estimation method typically uses an integer pixel grid, typically a macroblock for the current frame and a larger search space containing a co-located macroblock of the previous frame. A portion of the search area may be sampled to reduce the computational complexity of comparisons. A vector is generated to estimate temporal differences between where a macroblock appears in the current image and where the best representation appears in the reference image search area. The generated vector is a motion vector.

Contemporary video motion estimation methods have a trade-off between accuracy and computational cost (i.e., computation power and memory requirements). If a search algorithm requires a large number of comparisons to cover the search area, a great deal of computational power and time is required which can reduce the overall frame rate and thereby produce a jerky or erratic picture. If a small search area or small comparison set is used, a resulting picture may suffer from blocking defects. Consequently, there is a need for a system and method for computationally-efficient means of producing and evaluating motion vectors in a video frame.

SUMMARY

Motion estimation is crucial to the quality of a compressed video stream and is also the most computationally intensive step in any video encoding process. Many contemporary implementations for real-time encoding of a video stream sacrifice the quality of the motion estimation and resulting video stream by reducing both search ranges (e.g., a search pattern size) and total numbers of motion vectors evaluated. The pipelined architecture disclosed herein evaluates a greater number of motion vectors in a computationally efficient manner that is executed quickly. Redundancies that may exist in neighboring areas of the video image are utilized to compute proximate motion vectors concurrently.

In one exemplary embodiment, the present invention is a pipelined motion estimation system. Inputs to the pipelined motion estimation system include a current frame input storage means for storing contents of a current frame and a previous frame input storage means for storing contents of one or more previous frames. A sum-of-absolute differences (SAD) calculation module concurrently determines a best fit motion vector from a plurality of potential motion vectors where the plurality of potential motion vectors are based upon a pixel-based search pattern. The pixel-based search pattern may be programmable. A sum-of-absolute difference logic block concurrently determines a minimum residual value from the plurality of motion vectors. The motion vector having the lowest residual value across one or more search patterns may be used as a component of a video encoding scheme.

In another exemplary embodiment, the present invention is a pipelined motion estimation system. Inputs to the pipelined motion estimation system include a current frame input storage means for storing contents of a current frame and previous frame input storage means for storing contents of a plurality of previous frames. A motion command stage stores user-based parameters of a size and shape of pixel-based search patterns to define a search algorithm that covers an intended search area. A sum-of-absolute differences calculation module concurrently determines a best fit motion vector from a plurality of potential motion vectors where the plurality of potential motion vectors are based upon the pixel-based search pattern. A sum-of-absolute differences logic block concurrently determines a minimum residual value from the plurality of motion vectors.

Another exemplary embodiment of the present invention is also a method for estimating motion within a video system. The method includes providing input from one or more previous frames of data, providing input from a current frame of data, and selecting a pixel-based search pattern within the search area from the one or more previous frames of data. A sum-of-absolute differences is concurrently computed for a motion vector from each pixel within the pixel-based search pattern and a minimum residual value is computed for each of the motion vectors by comparing partial contents of the one or more previous frames of data with partial contents of the current frame of data. A single motion vector for the search pattern is selected based on the minimum residual value.

DETAILED DESCRIPTION

The present invention is a high-performance hardware pipeline for processing image data. A unique ability of this pipelined architecture is to process and deliver high quality images at a low cost and high speed by applying programmable search pattern sizes, generating motion vectors for pixels within the search pattern, and evaluating a best-fit motion vectors in a highly-parallel process. Evaluation of motion vectors at high speed is possible due to the use of pipelining (i.e., parallel processing of various calculations concurrently). The subsystem described herein, in one embodiment, consists of hardware blocks to facilitate high throughput and high-performance operations. However, the subsystem maintains a significant degree of programmability allowing digital camera and videoconference manufacturers to implement specific modifications while still retaining the high speed advantages described herein.

Figure 1:
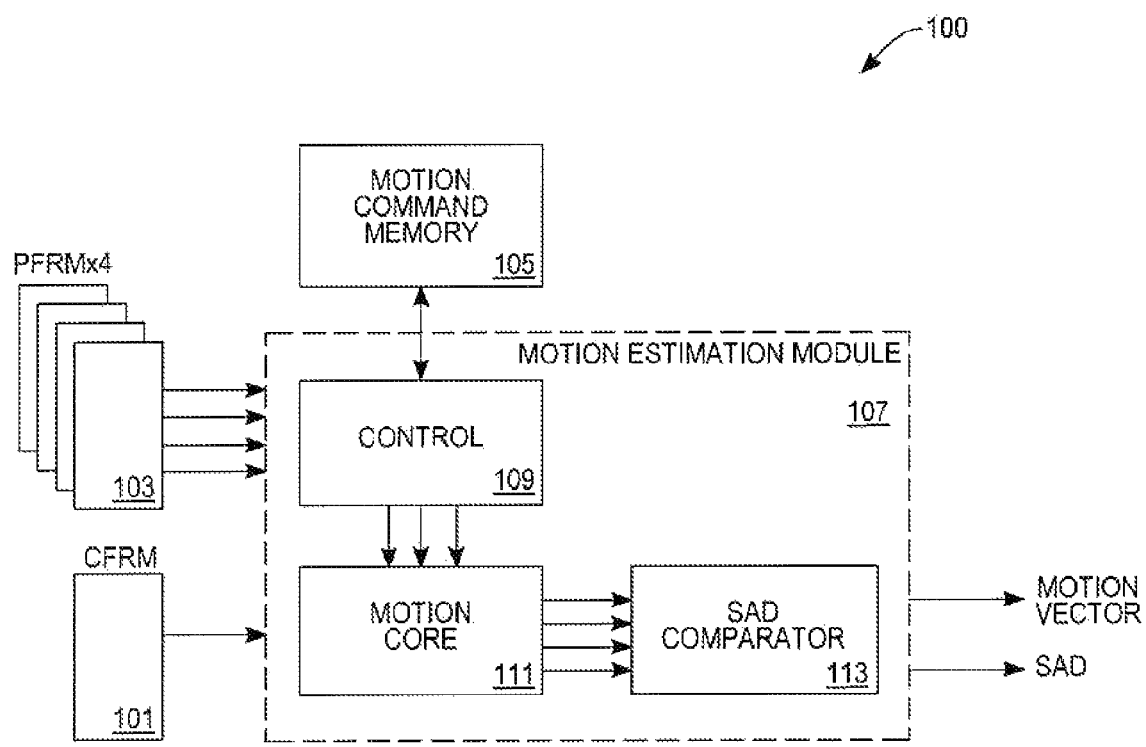
FIG. 1 is a block diagram showing an exemplary embodiment of a pipelined motion estimation module of the present invention.

With reference to FIG. 1, an exemplary motion estimation system 100 includes a portion of a current frame (CFRM) memory 101 undergoing a comparison with portions of four previous frame (PFRM) memories 103 to determine a best-fit motion vector appropriate for a search pattern within a search area in the PFRM memory 103. The exemplary motion estimation system 100 further includes a motion command memory module 105 and a motion estimation module 107. The motion estimation module 107 includes a control module 109, a motion core module 111, and a sum-of-absolute difference (SAD) comparator module 113. Each of the modules will be described in greater detail below. The motion estimation module 107 functions as a pipelined processor and produces a best-fit motion vector and a corresponding SAD residual value as outputs.

The motion command memory module 105 stores user-defined parameters that control search parameters (described in more detail with reference to FIG. 2, below). By programming the parameters in the motion command memory, the user can create one or more algorithms that are wither exhaustive or progressive and searches as mush of the search space as is needed. The programmed parameters include a line and pixel offset option, a search pattern size option, a line skipping option, and an offset from best option.

The line and pixel offset option allows a programmed offset to be applied to a search pattern from an initial starting location or from a best fit motion vector. The search pattern size option, described in more detail below, allows the user to select a 1×8, a 2×4, or a half-pel search pattern. The line skipping option allows the user to program a traverse of a macroblock in which one ore more lines are skipped at a time. Generally, no more than three lines are skipped at a time although three is not an inherent limit in the system. An increase in the number of lines skipped improves the speed of a search with a concomitant decrease in search accuracy. The offset from best option allows a user to program any line and/or pixel offsets from either an initial start location or from a best fit motion vector identified earlier in the motion estimation search. The offset from best option is useful for progressive and hierarchy searching.

Overall, the motion estimation module 107 compares contents of the CFRM memory 101 to contents of the PFRM memory 103 and determines a best-fit motion vector within a search area. The determination of the best-fit motion vector is accomplished by computing a SAD residual value for each of the motion vectors within the search pattern. The smallest SAD residual value across a combination of sample patterns results in the best-fit motion vector for the search area.

Figure 2:
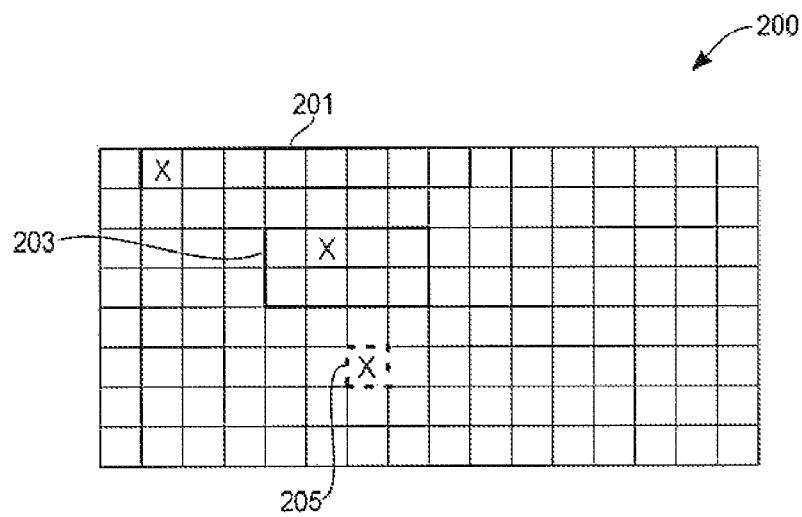
FIG. 2 is a macroblock portion of a video frame indicating various configurations and search patterns for potential motion vectors.

In FIG. 2, a portion 200 of a macroblock within the PFRM memory 103 indicates various exemplary search patterns considered herein. Although specific search pattern sizes are described, the same techniques are readily extensible to smaller and larger search pattern sizes. A 1×8 search pattern 201 is selected to allow computation of a SAD for each of eight motion vectors on a single line. A 2×4 search pattern 203 is selected to allow computation of a SAD for each of four motion vectors on two line (i.e., eight total vectors evaluated concurrently). Additionally, half-pixel (half-pel) resolution of a search pattern may be implemented. A half-pel search pattern 205 is selected to allow computation of a SAD for each of eight motion vectors within a single pixel (e.g., eight half-pels around a selected full pixel). An "A" in each of the three search patterns 201, 203, 205 indicates a pixel selected as a starting location within the search pattern chosen. A particular search algorithm is programmable in terms of search pattern size, starting location within the search pattern, and a direction in which the search pattern is traversed.

A search algorithm is used in determining a search pattern size, a starting location within the search pattern, and how the search pattern is traversed. The search algorithm is stored in the motion command memory module 105 (FIG. 1). For each command stored in the motion command memory module 105, the motion estimation module 107 will search and compare the SAD for each of the eight possible candidate motion vectors simultaneously (i.e., in parallel). A comparison is performed on each of the SAD calculations to determine a best-fit motion vector. The best-fit motion vector thus occurs when a difference between the previous data and the current data is the smallest. The simultaneous search and computation results in a highly parallel search routine, thus increasing throughput and significantly reducing an amount of time in determining a best-fit motion vector. Consequently, with an eight pixel or eight half-pel window, a full SAD computation for a 256 pixel macroblock may be performed in just over eight cycles per motion vector.

Figure 3:
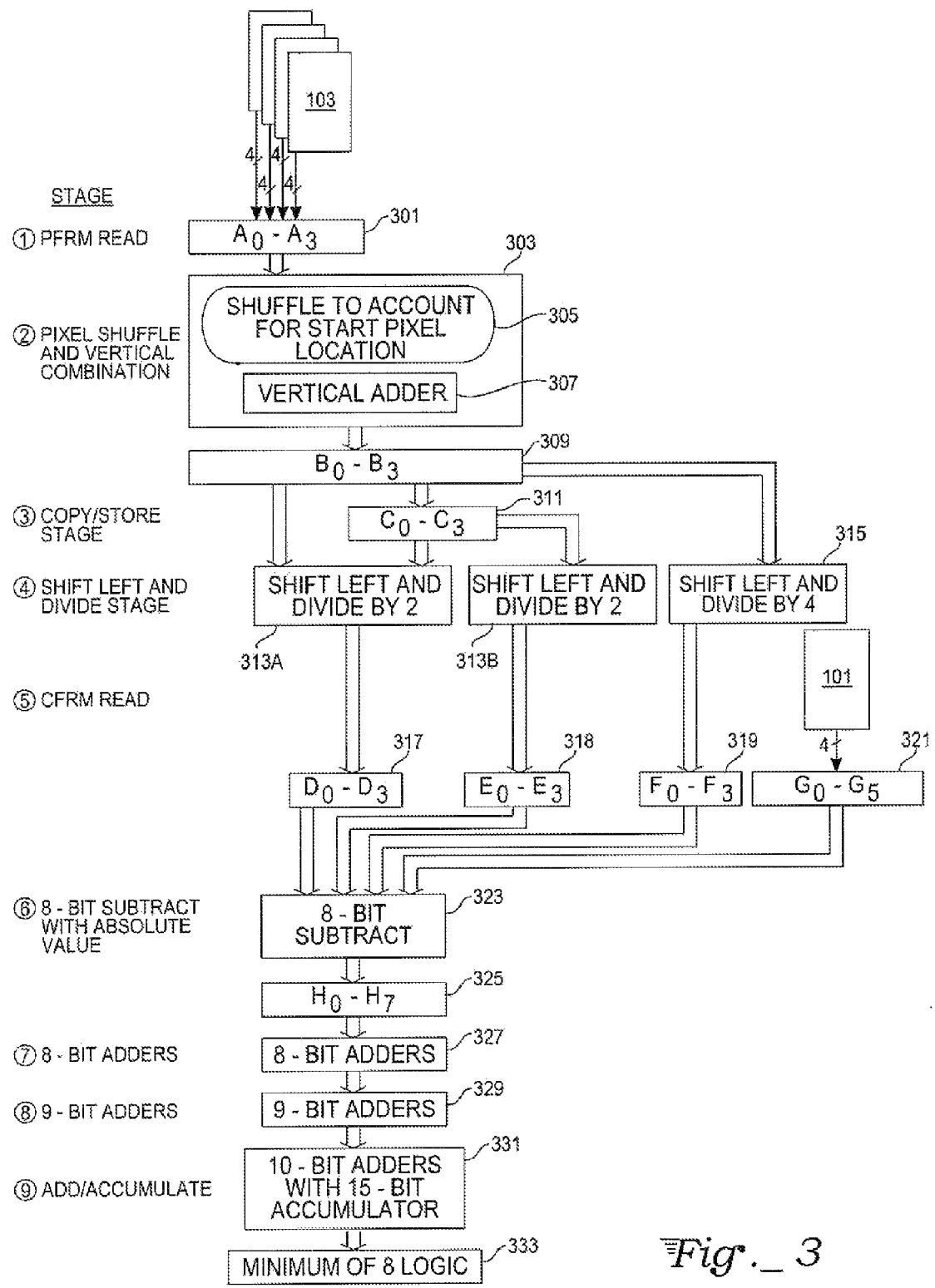
FIG. 3 is a flow diagram of an exemplary embodiment of the pipelined motion estimation module of FIG. 1.

With reference to FIG. 3, the pipelined exemplary motion estimation system 100 of FIG. 1 is illustrated and various pipelined stages are defined in detail. In this exemplary embodiment, the PFRM memory 103 is a bank of four 32-bit memories. Each pixel is eight bits wide allowing four pixels concurrently in each of the four PFRM memory 103 arrays. An "A-series" register bank 301 includes four 32-bit registers, $A_0$-$A_3$, (128 total bits or 16 pixels per cycle). Consequently, 4 pixels from each of the PFRM memory 103 arrays may be read concurrently into the first stage.

A second stage includes a pixel shuffle and vertical combination logic block 303. The pixel shuffle and vertical combination logic block 303 includes a shuffle pixel block 305 and a vertical adder 307. The shuffle pixel block 305 accounts for the starting location "X" within the chosen search pattern 201, 203, 205 (FIG. 2) as described above to prevent an misinterpretation of a location of the motion vector.

To calculate half-pel values from full pixel values as described with reference to the half-pel search pattern 205 of FIG. 2 above, the data must be interpolated in horizontal, vertical, and diagonal directions. The vertical adder 307 thus adds pixels from adjacent lines for vertical interpolations. Requirements for adding pixel values are described in further detail below.

A "B-Series" register bank 309 stores a version of the pixels contained in the A-series register bank 301 that has been shuffled in the pixel shuffle and vertical combination logic block 303 such that the pixels are in the correct order for a subsequent difference operation. Detailed operations of the B-series register bank 309 are presented below with reference to FIG. 4.

A copy/store stage retains a copy of the plurality of the data stored in the B-series register bank 309 in a "C-series" register bank 311. As discussed briefly above with reference both to the half-pel search pattern 205 of FIG. 2 and the vertical adder 307, a shift left and divide by two stage 313A, 313B or a shift left and divide by four stages 315 may be used. (The two shift left and divide by two stages 313A, 313B are provided for clarity and do not necessarily represent two physically unique stages.) For horizontal interpolations, two adjacent values from pixels that are side-by-side are added and divided by two. For vertical interpolations, two pixels from adjacent lines are added together and divided by two. For diagonal interpolations, four full pixels surrounding a candidate half-pel are added and divided by four. Therefore, divide by two and divide by four functions allow half-pel interpolation by effectively averaging neighboring values. Horizontal and vertical interpolation each involve adding two full pixel values and dividing by two to arrive at an average value. Similarly, diagonal interpolation involves adding four full pixel values and dividing by four. If the motion estimation module 107 is not operating in half-pel mode, then the division functions of the shift left and divide by two stage 313A, 313B and the shift left and divide by four stage 315 are not necessary. Thus, if a half-pel search pattern 205 is not used, then the plurality of the data stored in the second register bank 308 will be used without modification.

With reference to the "shift-left" component of these stages, recall that candidate motion vectors can be anywhere in the search space. However, lines of data are brought into the PFRM memory 103 from external memory sources in blocks of four pixels. If, for example, the left-most pixel of the starting vector does not line up on the same boundary as the memory, the pixels must be shifted so that the desired pixels line up with the registers. Consequently, the left shift operation aligns pixels by shifting out unnecessary pixels.

Contents from the shift left and divide by two stage 313A, 313B are stored in an "D-series" register bank 317 and an "E-series" register bank 318. Contents from the shift left and divide by four stage 315 are stored in an "F-series" register bank 319. Additionally, a CFRM read stage provides a storage location for the CFRM memory 101 into a "G-series" register bank 321.

The G-series register bank 321 contain data that have been received from the CFRM memory 101. Each of the G-series registers is a 32-bit register. The CFRM memory 101 is a single 32-bit memory. Consequently, each address of the CFRM memory 101 stores four pixels. When data form the CFRM memory 101 are fetched, they are stored alternately in either storage register $G_0$ or $G_1$. Once a SAD value is computed using these pixels, the pixels are written back to storage registers $G_2$-$G_5$.

Figure 4:
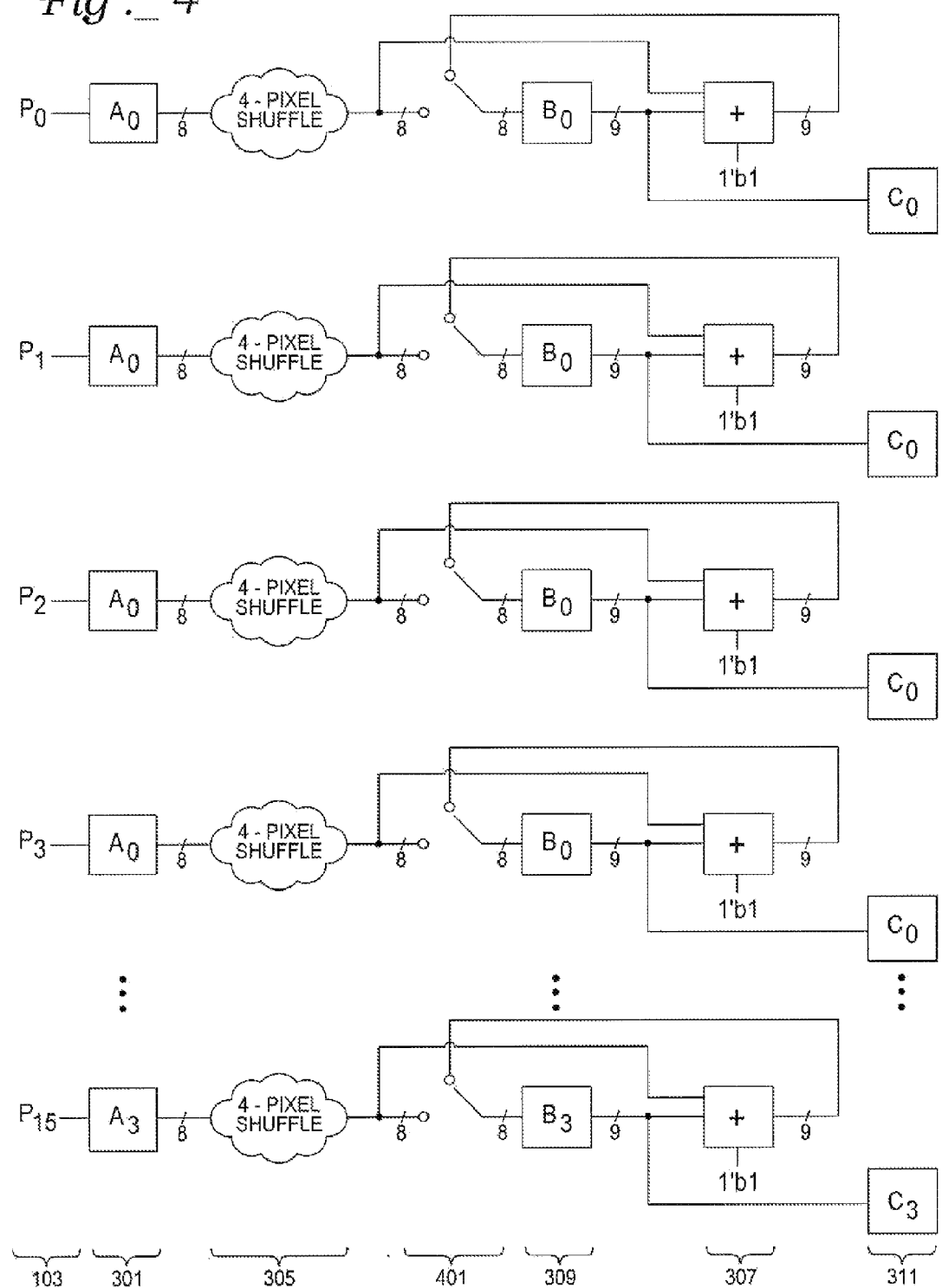
FIG. 4 is an exemplary block diagram showing details of the previous frame (PFRM) read, pixel shuffle, and vertical adder stages of the pipelined motion estimation module of FIG. 1.

FIG. 4 presents details of the B-series register bank 309 of FIG. 3. On alternating clock cycle, a switch 401 changes directions. An effect of the switch 401 is that, on the first cycle, the B-series register bank 309 contain the shuffled data from the A-series register bank 301. On the next cycle, the B-series register bank 309 contains the shuffled data from the line above added with the shuffled data from the current line. This operation provides the vertical combination when half-pel mode is selected. When using either a 1×8 or a 2×4 search pattern, the vertical combination is unused.

Figure 5:
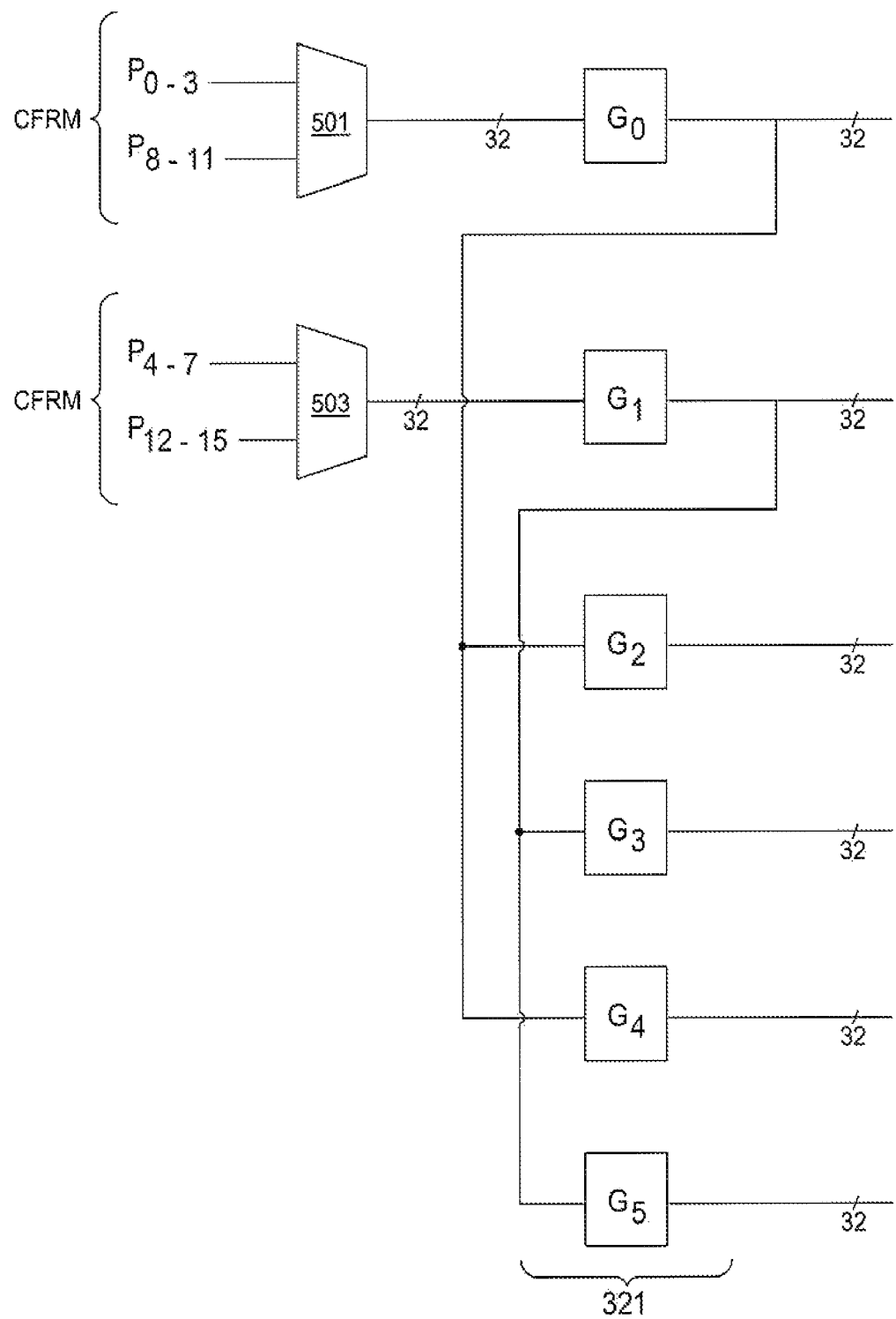
FIG. 5 is an exemplary block diagram of the current frame (CFRM) pixel load stage of the pipelined motion estimation module of FIG. 1.

With reference to FIG. 5 and continued reference to FIG. 3, registers $G_2$-$G_5$ contain data received from an entire previous line from CFRM memory 101. The previous line of data are re-used during a half-pel operation to calculate differences between the line and the bottom left, bottom middle, and bottom right half-pels. Details of these calculations are provided with reference to FIG. 6, below. Concurrent with these calculations, a new line from CFRM memory 101 is being loaded into registers $G_0$ and $G_1$. Consequently, half-pel calculations are performed simultaneously.

Figure 6:
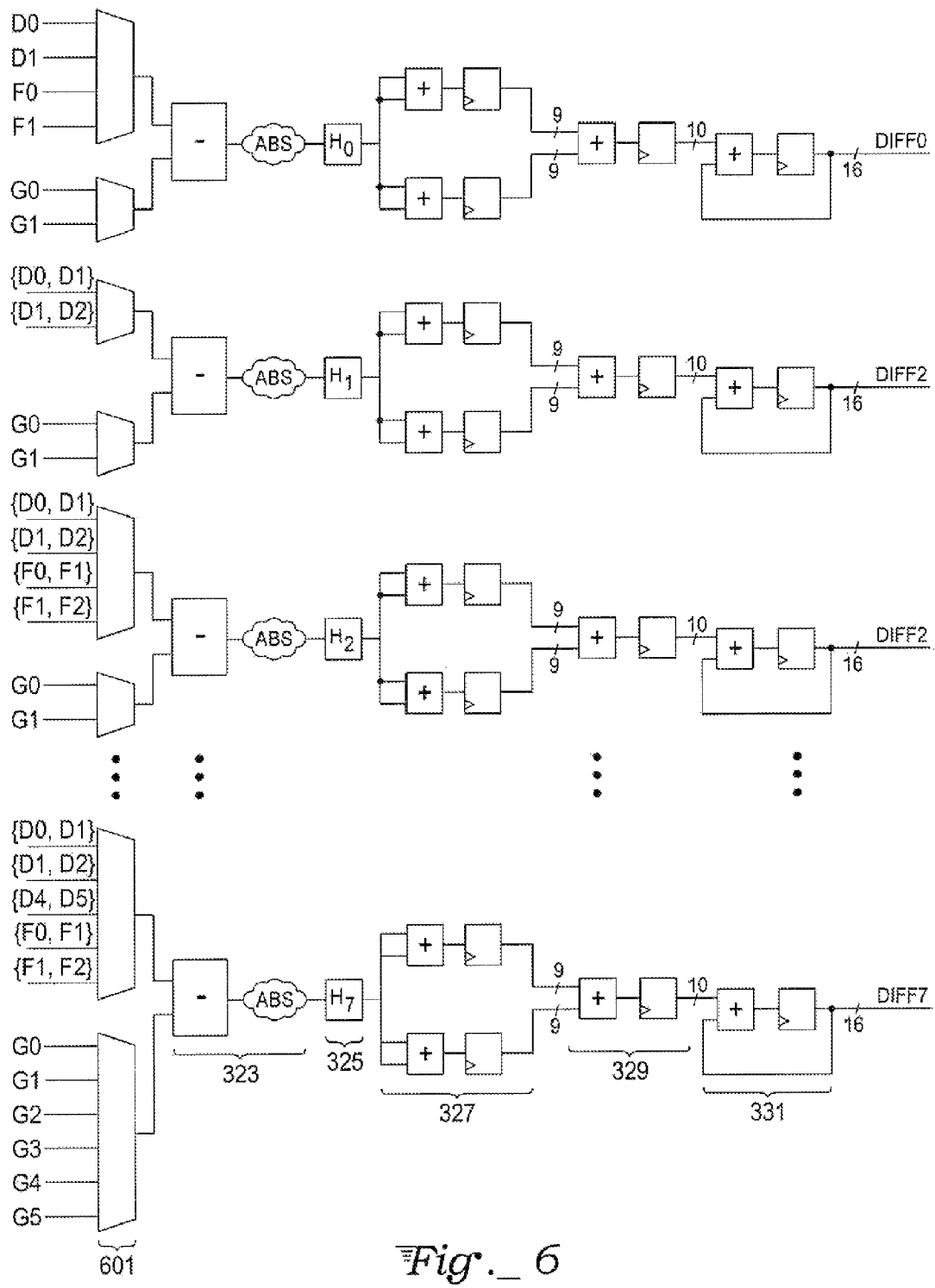
FIG. 6 is an exemplary sum-of-absolute difference calculation module of the pipelined motion estimation module in FIG. 1.

With reference to FIG. 6 and continued reference to FIG. 3, values from the selected sample search pattern are used in the actual SAD determination. Various types of SAD calculators are known in the art. Hence, the SAD calculator depicted with reference to FIGS. 3 and 6 is provided for illustration purposes and is merely exemplary.

A plurality of multiplexers 601 accepts inputs from various registers. In this exemplary embodiment, each of the plurality of multiplexers 601 has a 32-bit output. Output from the B-series register bank 309 is 9-bit per word (i.e., 36-bit registers, see FIG. 4) and the C-series register bank 311 is 8-bit per word (i.e., 32-bit registers). In either a 1×8 or a 2×4 search pattern mode, the C-series register bank 311 is selected. In a half-pel search mode, an output of a multiplexer is an interpolation of two lines. As discussed above, the lines are combined using the vertical adder 307 which feeds into the B-series register bank 309. Before feeding these data into the vertical adder 307, the least significant bit (LSB) of each 9-bit word is dropped, effectively resulting in a divide-by-two to complete the interpolation.

Inputs to the plurality of multiplexers 601 is selected based on which search mode is selected. Table II, below, summarizes inputs based on each of the three search pattern modes (1×8, 2×4, half-pel). Each mode utilizes data from pixels of reference data (D, E, and F register banks) and pixels of current data (G register bank).

TABLE II

Inputs for various search modes

| LOCATION | COMBINATION OF 8 PIXELS SELECTED FROM | ALTERNATE SELECTIONS |
|---|---|---|
| 1 × 8 SEARCH PATTERN | | |
| Single Row | $D_0, D_1, D_2$ | $G_0, G_1$ |
| 2 × 4 SEARCH PATTERN | | |
| Upper Row | $D_0, D_1, D_2$ | $G_0, G_1$ |
| Lower Row | $D_0, D_1, D_2$ | $G_2$-$G_5$ |
| HALF-PEL SEARCH PATTERN | | |
| Upper Left | $F_0, F_1, F_2, F_3$ | $G_0, G_1$ |
| Upper Middle | $D_0, D_1, D_2, D_3$ | $G_0, G_1$ |
| Upper Right | $F_0, F_1, F_2, F_3$ | $G_0, G_1$ |
| Middle Left | $E_0, E_1, E_2, E_3$ | $G_0, G_1$ |
| Middle Right | $E_0, E_1, E_2, E_3$ | $G_0, G_1$ |
| Lower Left | $F_0, F_1, F_2, F_3$ | $G_2$-$G_5$ |
| Lower Middle | $D_0, D_1, D_2, D_3$ | $G_2$-$G_5$ |
| Lower Right | $F_0, F_1, F_2, F_3$ | $G_2$-$G_5$ |

Outputs from pairs of the plurality of multiplexers are combined in an eight-bit subtracter 323 and an absolute value is taken of the result. Each of the absolute value is stored in an "H-series" bank of registers 325. Data from the H-series bank of registers 325 are loaded into a pair of eight-bit adders 327. A plurality of nine-bit adders 329 accepts results from each pair of eight-bit adders 327. Results from the plurality of nine-bit adders are loaded into a plurality of ten-bit adders/accumulators 331. Each of the ten-bit adders has a 15-bit accumulator. The sum-of-absolute differences for each of the eight search patterns is output from the plurality of ten-bit adders/accumulators 331. Each of the H-series bank of registers 325 contains four words that represent an absolute difference between pixels in the current block and the reference block. The eight-bit adders 327 and the nine-bit adders 329 are two-stage adders to combine the four words. As the engine progresses through processing an entire macroblock, the SAD values are accumulated in the plurality of ten-bit adders/accumulators 331.

Each of the eight outputs is ten evaluated for a determination of a lowest SAD residual value in a minimum of eight logic block 333 (FIG. 3). The minimum of eight logic block 333 may be comprised of, for example, a hardware-based comparator. The best-fit motion vector is selected as having the lowest SAD residual value. In the foregoing specification, the present invention has been described with reference to specific embodiments thereof. It will, however, be evident to a skilled artisan that various modifications and changes can be made thereto without departing from the broader spirit and scope of the invention as et forth in the appended claims. For example, skilled artisans will appreciate that various and additional registers may be used. Also, certain shift and divide stages made be eliminated depending upon particular types or search patterns chosen. Complete embodiments or portions of embodiments of the present invention may be implemented in hardware with various types of controllers, processors, and/or microprocessors. They may also be implemented in software, firmware, or a combination of hardware, software, and firmware. The specification and drawings are, accordingly, to be regarded in an illustrative rather than a restrictive sense.

We claim:

1. A pipelined motion estimation system comprising:
a current frame input storage means for storing contents of a current frame;
a previous frame input storage means for storing contents of one or more previous frames;
a motion command memory module configured to store a programmable search algorithm, the search algorithm specifying a pixel-based search pattern;
a sum-of-absolute differences calculation module;
a shuffle block coupled to the previous frame input storage means, the shuffle block configured to generate intermediate data;
a first plurality of registers coupled to the shuffle block, the first plurality of registers configured to store the intermediate data;
a subtraction block coupled to the first plurality of registers and also coupled to the current frame input storage means, the subtraction block configured to calculate differences between two sets of content to generate difference data; and
a second plurality of registers coupled to the subtraction block, the second plurality of registers configured to store the difference data;
a shift left and divide stage comprising a shift and divide block and a third plurality of registers;
wherein the intermediate data comprises pixel data;
wherein the shift and divide block is coupled between the first plurality of registers and the third plurality of registers, the shift and divide block configured to:
align the pixel data by shifting out any unnecessary pixel data from the intermediate data;
divide the intermediate data to produce divided intermediate data; and
store the divided intermediate data into the third plurality of registers; and
wherein the third plurality of registers is coupled between the shift and divide block and the subtraction block;
wherein the first of the two sets of content is the divided intermediate data; and
wherein the second of the two sets of content is the contents of the current frame;
wherein the pipelined motion estimation system is configured to:
search, as specified by the search algorithm, a previous frame for determining a best fit motion vector, for a particular area of the previous frame, from a plurality of potential motion vectors within the search pattern;
calculate, using the difference data, a sum-of-absolute difference residual value for each of the plurality of potential motion vectors within the search pattern, each of the sum-of-absolute difference residual values calculated concurrently with other sum-of-absolute difference residual values for the plurality of potential motion vectors; and
determine the best fit motion vector within the search pattern based on the sum-of absolute difference residual value calculated for each of the plurality of potential motion vectors.

2. The system of claim 1 wherein the pixel-based search pattern is based on eight adjacent pixels in the one or more previous frames.

3. The system of claim 1 wherein the pixel-based search pattern is based on eight adjacent half-pels in the one or more previous frames.

4. The system of claim 1 further comprising a vertical adder coupled to the first plurality of registers.

5. The system of claim 1 wherein determining the best fit motion vector includes determining a minimum sum-of-absolute difference residual value based on a comparison of portions of the contents of the current frame with portions of the contents of the one or more previous frames.

6. The system of claim 1 wherein the pixel-based search pattern is user selectable.

7. The system of claim 1 wherein the motion command memory module is configured to store user-based parameters including one or more of: a line and pixel offset option, a line skipping option, and an offset from best option.

8. The system of claim 7 wherein the motion command memory module is configured to store a search pattern size and a starting location within the search pattern.

9. A pipelined motion estimation system comprising:
a current frame input storage means for storing contents of a current frame;
a previous frame input storage means for storing contents of a plurality of previous frames;
a motion command stage configured to store a programmable search algorithm, the search algorithm specifying a pixel-based search pattern and a search area;
a sum-of-absolute differences calculation module;
a shuffle block coupled to the previous frame input storage means, the shuffle block configured to generate intermediate data;
a first plurality of registers coupled to the shuffle block, the first plurality of registers configured to store the intermediate data;
a subtraction block coupled to the first plurality of registers and also coupled to the current frame input storage means, the subtraction block configured to calculate differences between two sets of content to generate difference data; and
a second plurality of registers coupled to the subtraction block, the second plurality of registers configured to store the difference data;
wherein the pipelined motion estimation system is configured to concurrently determine a best fit motion vector associated with the search area from a plurality of potential motion vectors, the plurality of potential motion vectors based upon the pixel-based search pattern, wherein determining the best fit motion vector includes calculating a sum-of-absolute difference residual value for each of the plurality of potential motion vectors within the search pattern, each of the sum-of-absolute difference residual values calculated concurrently with other sum-of-absolute difference residual values for the plurality of potential motion vectors; and
a sum-of-absolute differences logic block configured to concurrently determine a minimum sum-of-absolute difference residual value from the plurality of motion vectors.

10. The system of claim 9 wherein the motion command stage is further configured to store one or more user-based search algorithms.

11. The system of claim 9 wherein the pixel-based search pattern is based on eight adjacent pixels in the plurality of previous frames.

12. The system of claim 9 wherein the pixel-based search pattern is based on eight adjacent half-pels in the plurality of previous frames.

13. The system of claim 9 further comprising a vertical adder stage.

14. The system of claim 9 wherein the sum-of-absolute differences logic block determines the minimum residual value based on a comparison of portions of the contents of the current frame with portions of the contents of the one or more previous frames.

15. A method for estimating motion within a video system, the method comprising:
 providing input from one or more previous frames of data;
 providing input from a current frame of data;
 selecting a pixel-based search pattern within a search area from the one or more previous frames of data;
 concurrently computing a sum-of-absolute differences for a motion vector from each pixel within the pixel-based search pattern, including traversing the pixel-based search pattern specified by a programmable search algorithm stored in a motion command memory module;
 computing a sum-of-absolute difference residual value for each of the motion vectors within the pixel-based search pattern by comparing partial contents of the one or more previous frames of data with partial contents of the current frame of data, wherein the computing comprises:
  saving the input from one or more previous frames of data into a first plurality of registers to produce saved previous data;
  saving the input from one or more current frames of data into a second plurality of registers to produce saved current data;
  shuffling the saved previous data to produce shuffled data, and saving the shuffled data, the shuffled data comprising pixel data, into a third plurality of registers;
  shifting and dividing, using a shift left and divide block coupled between the third plurality of registers and a fourth plurality of registers, the shuffled data to align pixel data by shifting out any unnecessary pixel data and to produce divided data, and saving the divided data into the fourth plurality of registers coupled to a subtraction block; and
  calculating, using the subtraction block, a difference between the saved previous data and the divided data;
 calculating a minimum residual value based on the sum-of-absolute difference residual value calculated for each of the plurality of motion vectors; and
 selecting a single motion vector based on the minimum residual value.

16. The method of claim 15 wherein the step of selecting the pixel-based search pattern is based on eight adjacent pixels in the one or more previous frames.

17. The method of claim 15 wherein the step of selecting the pixel-based search pattern is based on eight adjacent half-pels in the one or more previous frames.

18. The method of claim 17 further comprising averaging adjacent neighboring values of pixels to compute half-pel values.

19. The method of claim 15 further comprising providing a storage location for storing user-based parameters of a size and shape of a pixel-based search pattern within a macroblock.

20. The method of claim 15 further comprising programming user-based parameters of a size and shape of the pixel-based search pattern within the search area.

21. The method of claim 15 further comprising programming user-based search algorithms.

22. The system of claim 1 further comprising a fourth plurality of registers coupled between the current frame input storage means and the subtraction block, the fourth plurality of registers comprising a first plurality of subsections and a second plurality of subsections, and the fourth plurality of registers configured to:
 store a first portion of the contents of the current frame into the first plurality of subsections during a first cycle of a clock; and
 store a second portion of the contents of the current frame into the second plurality of subsections during a second cycle of the clock.

23. The system of claim 1, wherein:
 the shift and divide block is configured to divide the intermediate data by two; and
 the shift left and divide stage further comprises a second shift and divide block and a fifth plurality of registers, wherein the second shift and divide block is coupled between the first plurality of registers and the fifth plurality of registers, the second shift and divide block configured to:
  align the pixel data by shifting out any unnecessary pixel data from the intermediate data;
  divide the intermediate data by four to produce second divided intermediate data; and
  store the second divided intermediate data into the fifth plurality of registers; and
 the subtraction block is also configured to calculate differences between the second divided intermediate data and the contents of the current frame.

* * * * *

UNITED STATES PATENT AND TRADEMARK OFFICE
CERTIFICATE OF CORRECTION

PATENT NO. : 8,451,897 B2
APPLICATION NO. : 11/566540
DATED : May 28, 2013
INVENTOR(S) : Marshall A. Robers It is certified that error appears in the above-identified patent and that said Letters Patent is hereby corrected as shown below:

In the Specification

In Column 1, Line 9, delete "related" and insert --relates--, therefor.

In Column 1, Line 19, delete "have" and insert --has--, therefor.

In Column 1, Line 30, delete "chars" and insert --charts--, therefor.

In Column 1, Line 40, delete "results" and insert --result--, therefor.

In Column 2, Line 61, delete "may" and insert --map--, therefor.

In Column 3, Line 8-9, delete "advantages" and insert --advantage--, therefor.

In Column 3, Line 24, delete "computation" and insert --computational--, therefor.

In column 4, Line 44, delete "in" and insert --of--, therefor.

In Column 4 Line 52, after "at" delete "a".

In Column 4, Line 55, delete "vectors" and insert --vector--, therefor.

In Column 5 Line 17, delete "wither" and insert --either--, therefor.

In Column 5, Line 18, delete "mush" and insert --much--, therefor.

In Column 5, Line 28, delete "ore" and insert - or--, therefor.

In Column 5, Line 54, delete "line" and insert --lines--, therefor.

Signed and Sealed this
Seventeenth Day of September, 2013

Teresa Stanek Rea
*Deputy Director of the United States Patent and Trademark Office*

CERTIFICATE OF CORRECTION (continued)
U.S. Pat. No. 8,451,897 B2

In Column 5, Line 59, delete ""A"" and insert --"X"--, therefor.

In Column 6, Line 18, delete "pipelined" and insert --pipeline--, therefor.

In Column 7, Line 5, delete "308" and insert --309--, therefor.

In Column 7, Line 26, delete "form" and insert --from--, therefor.

In Column 7, Line 36, delete "contains" and insert --contain--, therefor.

In Column 7, Line 60, delete "9-bit" and insert --9-bits--, therefor.

In Column 7, Line 61, delete "8-bit" and insert --8-bits--, therefor.

In Column 8, Line 33, delete "subtracter" and insert --subtractor--, therefor.

In Column 8, Line 51, delete "ten" and insert --then--, therefor.

In Column 8, Line 61, delete "et" and insert --set--, therefor.

In Column 8, Line 64, delete "made" and insert --may--, therefor.